United States Patent [19]

Turold et al.

[11] 4,262,477
[45] Apr. 21, 1981

[54] FRESH MARKET TOMATO HARVESTER

[75] Inventors: William E. Turold, Woodland; Marvin O. Cufaude, Davis; Frank A. Diaz, Sacramento; Robert A. Hanson, Roseville, all of Calif.

[73] Assignee: Johnson Farm Machinery Co., Inc., Woodland, Calif.

[21] Appl. No.: 47,848

[22] Filed: Jun. 12, 1979

[51] Int. Cl.³ .............................................. A01D 17/08
[52] U.S. Cl. .................. 56/327 R; 56/16.4; 56/16.5; 171/27; 171/127
[58] Field of Search .............. 56/327 R, 400, 364, 56/330, 16.4–16.6, 329; 171/14, 18, 27, 127; 209/307, 308, 266, 267, 261, 665, 681

[56] References Cited

U.S. PATENT DOCUMENTS

| | | | |
|---|---|---|---|
| 335,902 | 2/1886 | Edwards | 209/267 |
| 1,968,939 | 8/1934 | Grabill | 209/665 |
| 2,183,439 | 12/1939 | Ahatz | 209/307 |
| 2,369,723 | 2/1945 | Denlinger | 171/14 |
| 3,295,302 | 1/1967 | Lee | 56/400 |
| 3,340,935 | 9/1967 | Csimma | 56/327 R |
| 3,390,768 | 7/1968 | Button | 56/327 R |
| 3,435,950 | 4/1969 | Suverkrop | 171/18 |
| 3,678,677 | 7/1972 | Miller | 56/327 R |
| 3,942,590 | 3/1976 | Friedel, Jr. et al. | 171/18 |
| 4,174,755 | 11/1979 | Siri | 56/16.5 |
| 4,175,621 | 11/1979 | Seem | 56/327 R |

*Primary Examiner*—Jay N. Eskovitz
*Attorney, Agent, or Firm*—Townsend and Townsend

[57] ABSTRACT

A fresh market tomato harvester comprises a leading knife for severing tomato plants, an inclined ascending conveyor for transporting the cut plants upwardly onto the harvester, a shaker bed for removing the tomatoes from the vines, transverse cross conveyors for receiving the tomatoes after they have been shaken from the vines and for transporting them laterally outward, longitudinally extending side sorting belts for receiving the tomatoes and transporting them rearwardly past workers who remove stems and other foreign matter as well as overripe fruit, sizing conveyors for automatically classifying the tomatoes by size and rejecting undersized tomatoes, and, optionally, a washing station for removing gummy matter and dust. The elevator carries arcuate tines, each of which is covered with surgical tubing which extends beyond the end of the metal tine to provide a resilient yielding structure. The shaker bed comprises shaker chains that are rubber coated, and further, the underlying cross conveyors are constructed with bars that are oversized and may be covered with a resilient material. In this manner, the fruit that reaches the side sorting belts has been protected from bruising. The side sorting belts are flanked by upwardly inclined sheet metal sidewalls to prevent fruit from falling off the belts and being lost. A low abrasive polyurethane strip is applied to the sidewalls so that fruit that rubs against the sidewalls is not scuffed.

5 Claims, 8 Drawing Figures

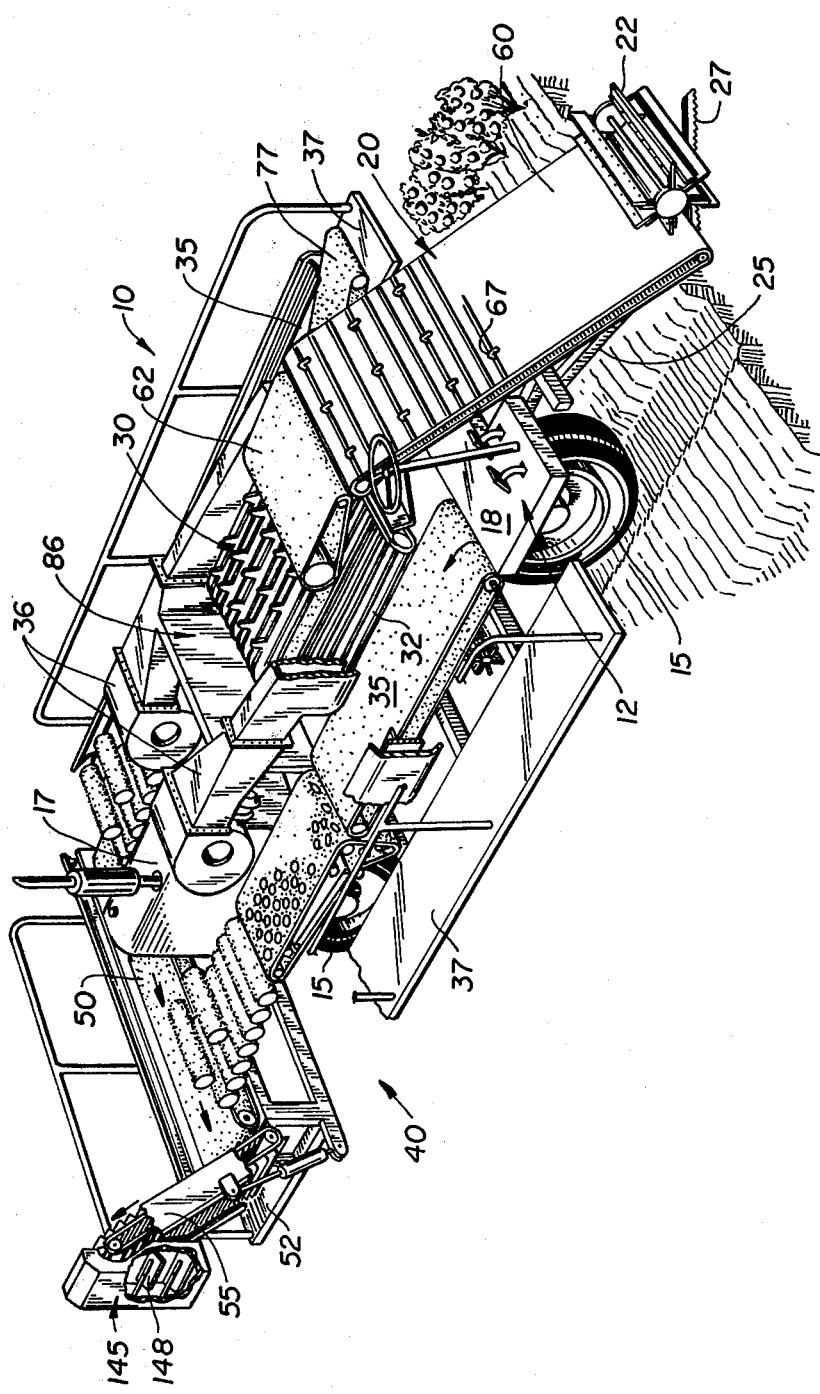

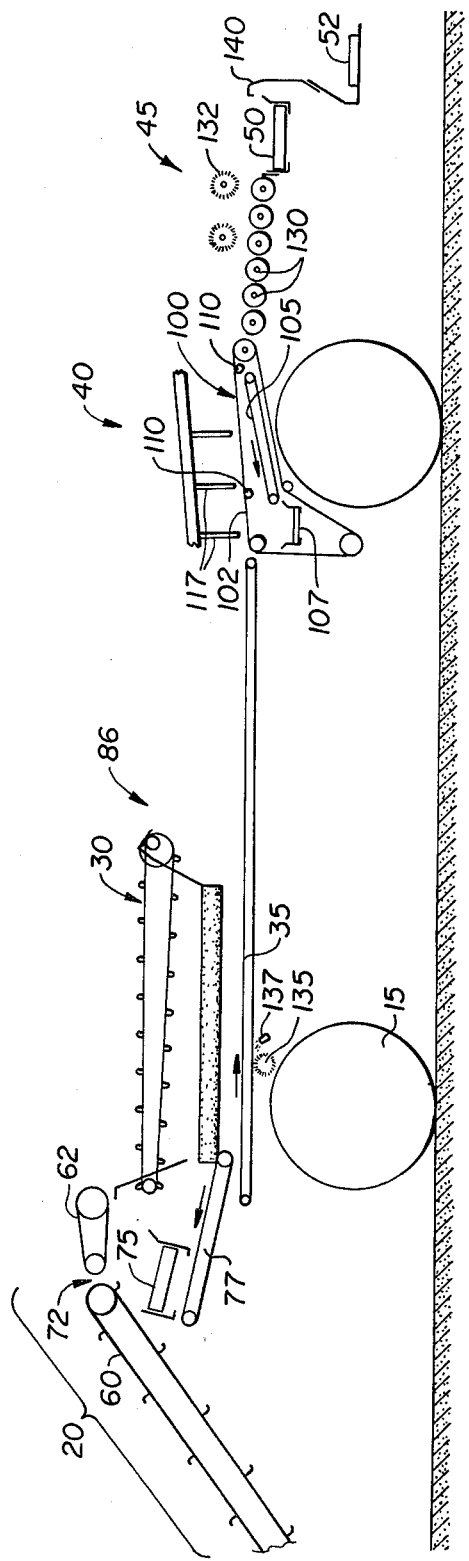
FIG._2.

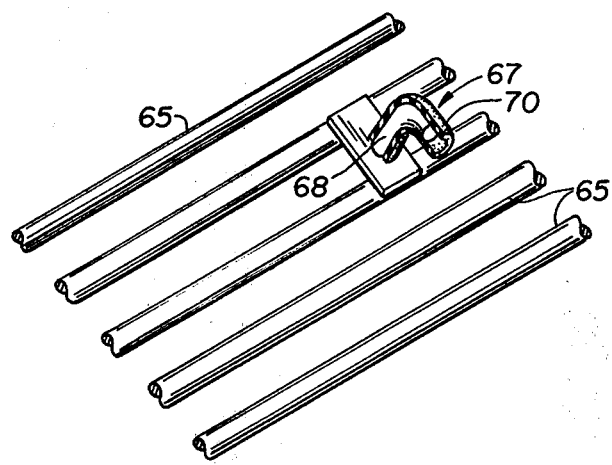
FIG._3.
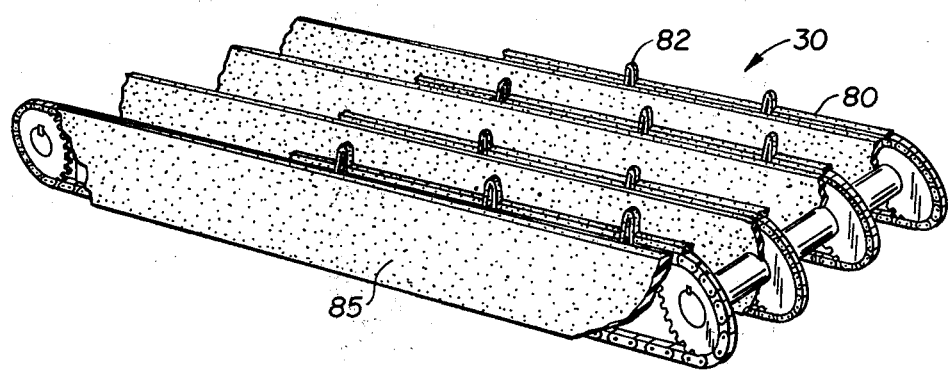
FIG._4.
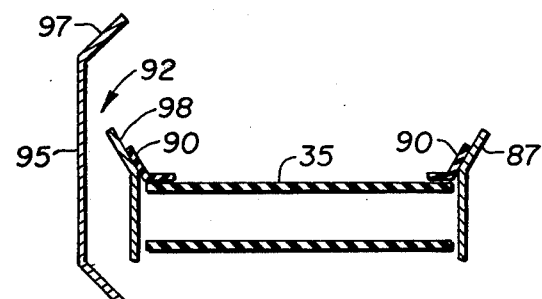
FIG._5.

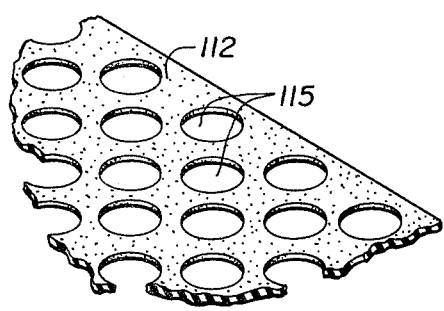
FIG._6.
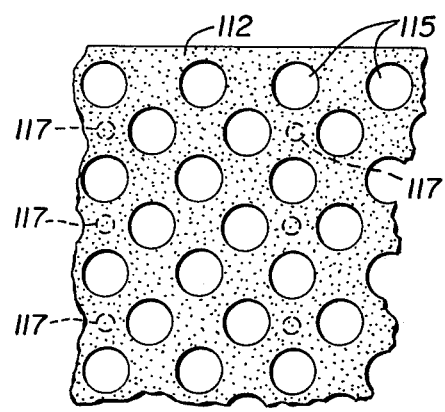
FIG._7.
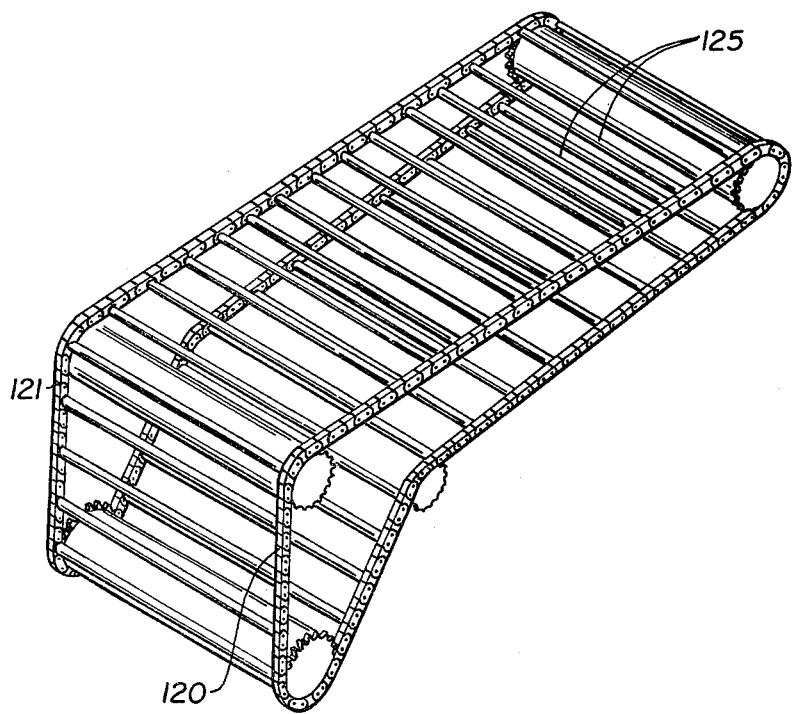
FIG._8.

FRESH MARKET TOMATO HARVESTER

FIELD OF THE INVENTION

This invention relates generally to harvesting equipment, and more specifically to a machine for harvesting fresh market tomatoes.

BACKGROUND OF THE INVENTION

Automated tomato harvesting is well known, and tomato harvesting machines are in widespread use. U.S. Pat. Nos. 3,390,768 and 4,091,931 are representative of tomato harvesters that are presently in commerical use. In operation, an automatic tomato harvester first severs the tomato vines from the ground and delivers the tomato-bearing vines upwardly and rearwardly on an inclined conveyor (elevator) to a shaker unit where the tomatoes are separated from the vines. The vines are discarded, typically by being discharged onto the ground, and on one comercially available harvester the separated tomatoes fall onto transversely extending cross conveyors which carry them outwardly to longitudinally extending sorting belts located along each side of the harvester. The longitudinally extending sorting belts carry the tomatoes rearwardly with respect to the harvester's direction of travel, and workers positioned therealong screen the tomatoes to remove rotten, overripe, or underripe tomatoes as well as foreign objects such as dirt clods and vine fragments.

In order to reduce the required number of workers, improvements directed to automatically rejecting culls and foreign objects have been developed, as for example in the above referenced U.S. Pat. No. 4,091,931. However, regardless of whether the tomatoes have been sorted by manual labor and/or automatic means, they pass rearwardly onto a transversely moving rear sorting belt where they are finally inspected prior to being delivered on an unloading elevator for discharge into large bins or bulk trucks being transported alongside the harvester.

Tomato harvesters of the above described type have found widespread acceptance and enjoyed considerable commercial success for the harvesting of so-called "process" tomatoes. These are ripe tomatoes which, upon being harvested, are immediately transported to nearby food processing plants for cooking and canning or bottling in the form of one of a number of processed tomato products. Since the harvested tomatoes are generally ripe, the emphasis on harvester design has been to avoid handling the tomatoes in such a way that puncturing the skin is likely to occur. Bruising and abrasion that do not result in a puncturing of the skin, while not particularly desireable, are not serious problems since appearance of the harvested tomatoes is not a major factor. While such occurrences do tend to cause premature spoilage, a long shelf life of the harvested product is not critical due to the substantially immediate processing that is carried out.

Unfortunately, harvesters of the above described type have generally proved unsuitable for automatically harvesting so-called "fresh market" tomatoes. These are tomatoes destined to be purchased by the consumer in their raw state. Fresh market tomatoes are usually harvested in a green state and maintained in cold storage for a period of several weeks until shipment to the produce market. Therefore, fresh market tomatoes must not be bruised or abraded, since appearance in the market is an important consideration to consumers, and since abrasion and bruising tend to cause premature spoilage. Therefore, reliance has been on the costly, tedious, and often undependable method of manual harvesting. A further requirement, namely that the harvested tomatoes be above a predetermined minimum size, further favors hand harvesting of fresh market tomatoes. Thus, while advances in the automated harvesting field have permitted growers of process tomatoes to realize greater crop yields per acre at lower costs, these benefits have been unavailable to growers of fresh market tomatoes.

SUMMARY OF THE INVENTION

The present invention is a fresh market tomato harvester that provides the grower of market tomatoes with the advantages heretofore available only to growers of process tomatoes. The harvester, according to the present invention, comprises a leading knife for severing tomato plants slightly below the surface of the ground, an inclined ascending conveyor (elevator) for transporting the cut tomato plants upwardly onto the harvester, a shaker bed for removing the tomatoes from the vines, transverse cross conveyors for receiving the tomatoes after they have been shaken from the vines and for transporting them laterally outward, longitudinally extending side sorting belts for receiving the tomatoes and transporting them rearwardly past workers who remove stems and other foreign matter as well as overripe fruit, sizing conveyors for automatically classifying the tomatoes by size and rejecting undersized tomatoes, and, optionally, a washing station for removing gummy matter and dust.

The elevator carries a regularly configured array of arcuate tines directed upwardly from the conveyor and thence in a direction opposite the direction of upward inclined travel. Each tine is covered with protective tubing which extends beyond the end of the metal tine to provide a resilient yielding structure which holds the vines and yet does not damage the tomatoes.

The shaker bed comprises shaker chains that are rubber coated, and further, the underlying cross conveyors are constructed with bars that are oversize and may be covered with a resilient material. In this manner, the fruit that reaches the side sorting belts has been protected from bruising. The side sorting belts themselves run longitudinally and are flanked by upwardly inclined sheet metal sidewalls to prevent fruit from falling off the belts and being lost. A low abrasive polyurethane strip is applied to the sidewalls so that fruit that rubs against the sidewalls is not scuffed.

Workers at the side sorting belts survey the fruit being deposited thereon for damage, overripeness, and further remove stems that might have been shaken off the vines with the tomatoes. Additionally, any foreign material that did not fall through the cross conveyors is removed.

The tomatoes on the side sorting belts then pass to respective sizing conveyor assemblies which remove and discard tomatoes that fall below a predetermined size. Each sizing conveyor assembly includes a sizing conveyor, preferably constructed of a belt of flexible sheet material which provides a regular array of round apertures (typically staggered rows), through which apertures the undersized tomatoes may fall. Tomatoes falling through the apertures are transported away from the vicinity of the sizing belts and typically discharged from the harvester back into the field. A plurality of downwardly extending resilient smooth fingers overlies the sizing belts and gently guides the tomatoes toward the apertures so that they may be sized. In an alternate embodiment, suited for use under conditions where a large amount of dirt and the like is carried along with the tomatoes, the sizing conveyor comprises paired roller chains between which extend regularly spaced perpendicular bars. The bars are at a spacing that permits undersized tomatoes, clods of earth, and other debris to fall between adjacent bars, while supporting those tomatoes of sufficient size.

According to a further aspect of the present invention, the harvester may provide a tomato cleaning station mounted between the sizing conveyors and the rear sorting belt into which fruit being discharged from the sizing belt enters. Depending on soil and other field conditions, the fruit may be sprayed with water and/or brushed with low abrasion brushes to remove dirt. Water for washing is carried in tanks and is sprayed in a fine mist to minimize consumption. A wash mechanism comprising spray nozzles and brushes may be provided on the underside of each side sort belt to keep the belt clean and thus minimize contamination of the tomatoes. Such a belt cleaning mechanism is more important when a tomato cleaning station is not provided. Thereafter, the tomatoes are discharged onto the transversely moving rear sorting belt for a final inspection and sorting by workers positioned at the rear of the harvester. The rear sorting belt carries the tomatoes onto an unloading elevator which delivers them into a bin or bulk truck.

Thus, the present invention provides the grower of fresh market tomatoes with means for harvesting his crop in a highly automated and efficient manner. This eliminates a considerable amount of costly and inefficient manual labor and results in a greater yield per acre. The particular construction of the harvester with its padded elevator tines, shaker bed, and cross conveyors assures that the tomatoes are delivered in a natural, undamaged state, previously unavailable with mechanical harvesting. The sizing conveyors eliminate the need for costly manual sorting in order to provide harvested tomatoes of suitable size. For a further understanding of the nature and advantages of the present invention, reference should be had to the remaining portions of the specification and to the attached drawings.

BRIEF DESCRIPTION OF DRAWINGS

FIG. 1 is a perspective view of a harvester according to the present invention;

FIG. 2 is an elevational schematic view of the harvester;

FIG. 3 is a fragmentary perspective view of the elevator;

FIG. 4 is a fragmentary perspective view of the shaker bed;

FIG. 5 is a transverse sectional schematic view of one of the side sort conveyors;

FIG. 6 is a fragmentary perspective view of a first embodiment of the sizing conveyors;

FIG. 7 is a top plan view showing the position of fingers for use with the sizing belt of FIG. 6; and FIG. 8 is a perspective view of a second embodiment of the sizing conveyors.

DETAILED DESCRIPTION OF THE INVENTION

FIG. 1 is a perspective view showing a tomato harvester 10 according to the present invention. Harvester 10 is a self-propelled device that is driven along rows of tomato plants in a field. To this end, harvester 10 includes a chassis 12 mounted to a plurality of power driven and steerable wheels 15. A motor, 17 provides mechanical power for moving harvester 10 over the tomato field to be harvested. Mounted to chassis 12 are the various harvester components to be described below. A driver station 18 is located on a first side of the harvester. For convenience, longitudinal and transverse motion will be defined with respect to the direction of harvester travel.

Adjacent a forward end of harvester 10 is a front elevator 20 extending from a forward position proximate the ground to a rearward position upwardly disposed therefrom. The front end of elevator 20 has mounted thereto a reel 22. A forwardly extending boom 25 is pivotally connected to a front portion of chassis 12 and supports elevator 20 at its forward end. A blade 27 carried on boom 25 severs tomato plants slightly below ground level whereupon reel 22 and elevator 20 cooperate in carrying the severed plants (including vines and fruit) upwardly and rearwardly. Elevator 20 discharges the plants onto a shaker bed 30 located at a generally central position on harvester 10. Shaker bed 30 carries the plants rearwardly but also subjects them to a longitudinal horizontal oscillatory motion so that the tomatoes fall downwardly through the shaker bed to a pair of underlying outwardly driven cross conveyors 32 that receive the tomatoes and transport them outwardly to the sides of the machine. Cross conveyors 32 discharge the tomatoes onto longitudinally extending rearwardly driven side sort belts 35. Blowers 36 are provided to direct an air blast inwardly and somewhat downwardly along the entire longitudinal dimension of cross conveyors 32 at the point where they turn under to reverse direction so that leaves and vine fragments are not discharged onto side sort belts 35. Platforms 37 are mounted to chassis 12 outward of and alongside each side sort belt 35 so that a plurality of workers stationed thereon may remove stems and other foreign matter as well as overripe fruit. Side sort belts 35 transport the tomatoes rearwardly to respective sizing stations 40. Optional cleaning stations 45 may be located behind sizing stations 40. The tomatoes are then discharged onto a single transversely driven rear sorting belt for a final inspection by workers who may be positioned on a transversely extending platform 52 mounted at the rear of the harvester. An unloading conveyor 55 receives the sized, possibly cleaned, sorted tomatoes from rear sorting belt 50 and carries them upwardly and transversely where they are discharged into a bulk truck or bin that is being transported alongside harvester 10 for the purpose of receiving tomatoes.

Having described the general operation of the present invention, a detailed description of the individual components may be understood.

The construction of elevator 20 is best seen with reference to FIGS. 1, 2, and 3. Elevator 20 comprises an upwardly inclined conveyor 60 and a relatively short generally horizontal conveyor 62 proximate the upper end thereof. Conveyors 60 and 62 are fabricated from "potato chain" which is available commercially and incorporates spaced bars which are linked in parallel relationship at their ends. For example, conveyor 60 comprises transversely extending bars 65. Intermittent ones of bars 65 carry respective rows of tines 67, which tines extend generally perpendicular to the plane of conveyor 60, and then toward the leading end of elevator 20. Each tine 67 includes a metal structural member 68 and a resilient covering 70 such as a piece of surgical tubing extending a short distance beyond to the end of structural member 68.

Conveyors 60 and 62 are spaced apart by a gap 72 sized to permit earth clods and tomatoes that have separated from their vines to fall through. Underlying gap 72 is a tilted cross conveyor 75, preferably fabricated from "potato chain", that is driven transversely to a second side of the harvester remote from driver station 18. Cross conveyor 75 is tilted downwardly towards the rear of the harvester so that tomatoes falling onto conveyor 75 roll downwardly toward the rear edge while dirt tends to remain on the portions of the conveyor nearer the upper edge. An inclined longitudinally extending conveyor 77 on the second side of the harvester receives the dirt and tomatoes from tilted cross belt 75. Belt 77 slopes downwardly toward the rear of the harvester but is driven such that its upper surface moves upwardly towards the front of the harvester. Tomatoes deposited on belt 77 roll gravitationally downwardly (against the movement of belt 77) and onto the one of side sort belts 35 located on the second side of the harvester. The dirt that is deposited by cross belt 75 on upwardly moving conveyor 77 is carried forward by the conveyor and is discharged onto the ground.

The construction of shaker bed 30 is best seen with reference to FIGS. 1, 2, and 4. Shaker bed 30 comprises a plurality of horizontally elongate chain loops 80 lying in respective spaced parallel vertical planes. A plurality of outwardly extending fingers 82 is mounted to each chain in serial fashion. Respective chain guards 85 enclose loops 80 while allowing fingers 82 to protrude upwardly therebeyond. Suitable means, not shown, provides a generally rearward movement of the upper portion of each chain loop 80, which movement is accompanied by a back and forth oscillatory motion. The spacing of chain loops 80 is sufficient to define gaps through which tomatoes fall as they are taken from their vines. The vines, having had their tomatoes shaken off, are carried rearwardly and discharged onto the ground at a generally central location 86 of the harvester. Chain loops 80, fingers 82, and chain guards 85 are covered with a layer of flexible resilient material such as rubber. Thus, as the vines are discharged from conveyor 62, the tomatoes are not bruised by contact with the shaker bed. Cross conveyors 32 underlying shaker bed 30 receive the tomatoes shaken off the vines by shaker bed 30. Cross conveyors 32 are constructed to protect the tomatoes falling thereon from bruising. To this end, oversized bars are used. Thus, while the cross conveyors on a process tomato harvester typically comprise bars having a diameter in the neighborhood of 1¼" with a comparable gap between adjacent bars, cross conveyors 32 according to the present invention comprise oversized bars having a typical diameter of 2" with a 1¼" gap. Depending on the condition of the tomatoes and on individual preferences, the 2" diameter bars may be entirely fabricated from metal, or they may be fabricated from a 1" diameter bar with a resilient sleeve mounted coaxially thereabout to present an outer diameter of approximately 2".

The construction and configuration of side sort belts 35 is best seen with reference to FIGS. 1, 2, and 5. Each of side sort belts 35 is a standard flexible belt of a rubber or similar material driven in an endless loop. Generally vertical stationary guides 87 flank belt 35 to maintain tomatoes on belt 35. Each guide 87 is preferably lined with a strip 90 of low abrasion material such as polyurethane to minimize scuffing of the tomato skins. As discussed above, workers stationed alongside side sorting belts 35 remove foreign material as well as tomatoes having obviously undesirable characteristics. In order to facilitate the worker's movements, a waste chute 92 is provided alongside side sort belts 35. Waste chute 92 is defined by a generally vertical sheet metal guard 95 spaced outwardly from belt 35 and extending vertically above and below belt 35 by a distance greater than the diameter of the tomatoes to be rejected. Guard 95 has an upwardly inclined flange along its upper end to guide tomatoes and other foreign material into the region between guard 95 and belt guide 87, and a downwardly and inwardly extending lower portion which may extend below platform 37 to discharge discarded material away from the worker's feet. Thus, workers need merely flip the material to be rejected toward them and over the guide for the material to fall through the region onto the ground.

The construction of sizing stations 40 is best seen with reference to FIGS. 1, 2, and 6–8. At the heart of sizing station 40 is a sizing conveyor 100 having an upper portion 102 onto which side sort belt 35 deposits tomatoes to be sized. Sizing conveyor 100 is driven in an endless loop such that an upper portion 102 moves rearwardly. Within the loop formed by conveyor 100, are a frontwardly driven belt 105 and a transversely driven belt 107. Belt 105 discharges material thereon onto belt 107 which discharges such material onto the ground. Sizing conveyor 100 has a plurality of openings of a dimension corresponding to the minimum size tomatoes desired. Accordingly, undersized tomatoes as well as small pieces of foreign material drop through the openings in conveyor 100 and fall onto either of belts 105 or 107. The material falling on belt 105 is discharged onto belt 107 which discharges it to the ground. Upper conveyor portion 102 rides over a plurality of hexagonal rollers 110 which provide a gentle vibrating action to aid the tomatoes in falling through the openings.

FIGS. 6 and 7 are fragmentary perspective and top plan views, respectively, of a first embodiment of sizing conveyor 100. According to this first embodiment, sizing conveyor 100 comprises a flexible belt 112 having a plurality of circular apertures 115 of diameter corresponding to the minimum diameter of tomatoes desired. Apertures 115 are preferably in a regular array comprising alternately staggered rows of apertures. This may be seen with reference to the elevational view of FIG. 7. In order to facilitate the passage of undersized tomatoes through apertures 115, a plurality of downwardly extending resilient smooth fingers 117 is provided to urge tomatoes into positions overlying respective apertures. Fingers 117 are disposed in a plurality of rows interleaved with intermittent rows of apertures 115. Fingers 117 may comprise a core of spring steel wire covered by a resilient layer formed from surgical tubing or like material.

FIG. 8 is a fragmentary perspective illustrating a second embodiment of sizing conveyor 110. According to this embodiment, paired roller chains 120 and 121 are disposed in spaced vertical planes and have extending therebetween regularly spaced perpendicular bars 125 at a spacing that permits undersized tomatoes, clods of earth, and other debris to fall between adjacent bars while supporting those tomatoes having sufficient size. This second embodiment subjects the tomatoes to slightly less gentle handling than the first embodiment, but is typically required when soil conditions are such that a large amount of dirt is carried along with the tomatoes.

The construction of wash stations 50 is best seen with reference to FIG. 2. Sizing conveyor 100 discharges its tomatoes onto a plurality of rotating brushes 130. Brushes 130 have bristles of a low abrasion material such as soft nylon to avoid scuffing the tomato skins. Overlying rotary brushes 132 may be provided also. The cleaning requirements are a highly variable parameter, depending on soil conditions and the like. Accordingly, it is sometimes desired to spray the tomatoes with water in addition to or as an alternative to brushing them. Water for washing is carried in tanks, not shown, and the spray is sufficiently fine that frequent refilling is not necessary.

A useful adjunct or alternative to cleaning the tomatoes is afforded by continuous cleaning of side sort belts 35. To this end, a rotary brush 135 and spray nozzles 137 are located on the underside of each side sort belt. Brushes 135 have somewhat stiffer bristles than brushes 130 and 132, but are still relatively soft to avoid undue wearing of the belt. Cleaning the belt in this manner tends to reduce abrasion and bruising of tomatoes that might otherwise occur if the tomatoes were deposited on a belt having clods of earth and the like adhering thereto.

Rear side belt 50 is of generally similar construction and configuration to side sort belts 35. In particular, a waste chute 140 is provided for workers standing on rear platform 52 to discard culls. Elevator 55 is of standard configuration and has the function of receiving tomatoes from rear sort belt 50 and conveying them upwardly and outwardly from the harvester so that they may be discharged into a bin or truck. For tomatoes that are especially susceptible to bruising, a decelerator 145 is preferably fitted to the upper end of rear elevator 55 so that tomatoes falling downwardly are slowed prior to their being deposited in the truck or bin. Decelerator 145 comprises a downwardly opening housing 147 through which tomatoes fall and a plurality of resilient flaps 148 therein for slowing the fall.

In summary, it can be seen that the present invention provides a surprisingly effective means and method for mechanically harvesting fresh market tomatoes and thus provides the grower of market tomatoes with the advantages previously available only to growers of process tomatoes by minimizing bumping and scuffing at every step of the harvesting process. While the above provides a full and complete disclosure of the preferred embodiments of the invention, various modifications, alternate constructions, and equivalents may be employed without departing from the true spirit and scope of the invention. For example, bars 65 on conveyor 60 could be coated with resilient material to even further minimize the possibility of bruising. Moreover, while a generally rearward flow of tomatoes on the harvester has been described, other harvester configurations are possible. Therefore, the above description and illustration should not be construed as limiting the scope of the invention which is defined by the appended claims.

What is claimed is:

1. A fresh market tomato harvester for collecting tomatoes from a field and delivering them into a waiting receptacle in condition suitable for ultimate sale in their raw, natural state comprising:
   means for gathering tomato vines and tomatoes from said field and for transporting them onto the harvester, said gathering means including a first conveyor having upwardly extending, forwardly directed tines, said tines being covered with a resilient material to avoid bruising of said tomatoes;
   shaking means for separating said tomatoes from said vines, said shaking means including tomato confronting portions that are covered with a resilient material to avoid bruising said tomatoes, wherein said tomatoes upon being shaken from said vines fall downwardly; a second conveyor for receiving said falling separated tomatoes, the surface of said second conveyor adapted to prevent tomatoes falling thereupon from being bruised;
   means for transporting said tomatoes to a first location on said harvester; and
   sizing means located at said first location including means defining openings through which tomatoes beneath a minimum predetermined size may fall and means for discharging said undersized tomatoes, while retaining those tomatoes above said predetermined size.

2. The invention of claim 1 wherein said transporting means includes a moving belt, vertically extending sidewalls longitudinally flanking said belt to maintain tomatoes thereupon, and strips of low abrasive material along said sidewalls to prevent scuffing of said tomato skins.

3. The invention of claim 1 wherein said sizing means comprises:
   a plurality of parallel bars, spaced apart such that the clearance therebetween corresponds to said predetermined dimension; and
   means for maintaining said bars at said fixed separation and driving them in an endless loop perpendicular to their axial dimension.

4. The tomato harvester of claim 1 wherein said second conveyor comprises a plurality of rollers, said rollers sized and spaced to prevent said falling tomatoes from being bruised.

5. The tomato harvester of claim 4 wherein said rollers are about 2 inches in diameter with about $1\frac{1}{4}$ inch spacing between said rollers.

* * * * *